United States Patent
Rockstroh et al.

(10) Patent No.: US 7,217,102 B2
(45) Date of Patent: May 15, 2007

(54) COUNTERING LASER SHOCK PEENING INDUCED AIRFOIL TWIST USING SHOT PEENING

(75) Inventors: Todd Jay Rockstroh, Maineville, OH (US); Roger Owen Barbe, Cincinnati, OH (US); Seetha Ramaiah Mannava, Cincinnati, OH (US)

(73) Assignee: General Electric Campany, Schenectady, NY (US)

( * ) Notice: Subject to any disclaimer, the term of this patent is extended or adjusted under 35 U.S.C. 154(b) by 156 days.

(21) Appl. No.: 11/171,147

(22) Filed: Jun. 30, 2005

(65) Prior Publication Data
US 2007/0003418 A1    Jan. 4, 2007

(51) Int. Cl.
*F01D 5/14* (2006.01)

(52) U.S. Cl. .................. 416/235; 416/241 R; 416/243; 416/223 A; 29/889.2

(58) Field of Classification Search ................ 416/235, 416/241 R, 243, 223 A; 29/889.2; 219/121.6; 148/525
See application file for complete search history.

(56) References Cited

U.S. PATENT DOCUMENTS

| | | | |
|---|---|---|---|
| 5,409,415 A | 4/1995 | Kawanami et al. | |
| 5,492,447 A | 2/1996 | Mannava et al. | |
| 5,531,570 A | 7/1996 | Mannava et al. | |
| 5,591,009 A | 1/1997 | Mannava et al. | |
| 5,674,328 A | 10/1997 | Mannava et al. | |
| 5,674,329 A | 10/1997 | Mannava et al. | |
| 5,744,781 A | 4/1998 | Yeaton | |
| 5,756,965 A | 5/1998 | Mannava | |
| 5,873,770 A | 2/1999 | Hashimoto | |
| 5,932,120 A | 8/1999 | Mannava et al. | |
| 5,948,293 A * | 9/1999 | Somers et al. | 219/121.85 |
| 6,215,097 B1 | 4/2001 | Mannava | |
| 6,220,947 B1 | 4/2001 | Wheat et al. | |
| 6,852,179 B1 | 2/2005 | Toller et al. | |
| 6,923,877 B1 * | 8/2005 | Anderson | 148/525 |
| 6,969,821 B2 * | 11/2005 | Mika et al. | 219/121.83 |

* cited by examiner

*Primary Examiner*—Ninh H. Nguyen
(74) *Attorney, Agent, or Firm*—William Scott Andes; Steven J. Rosen

(57) ABSTRACT

A gas turbine engine blade is laser shock peened by laser shock peening a thin airfoil of the blade, forming a laser shock induced twist in the airfoil, and shot peening a portion of the airfoil to counter the laser shock induced twist in the airfoil. The shot peening may be performed before or after the laser shock peening. The shot peening may be applied over a laser shock peened surface formed by the laser shock peening. The shot peening may be performed asymmetrically on asymmetrically shot peened pressure and suction side areas of pressure and suction sides, respectively, of the airfoil. A shot peened patch near a blade tip may be formed on one of pressure and suction sides of the airfoil wherein the airfoil extends radially outwardly from a blade platform to the blade tip of the blade.

17 Claims, 6 Drawing Sheets

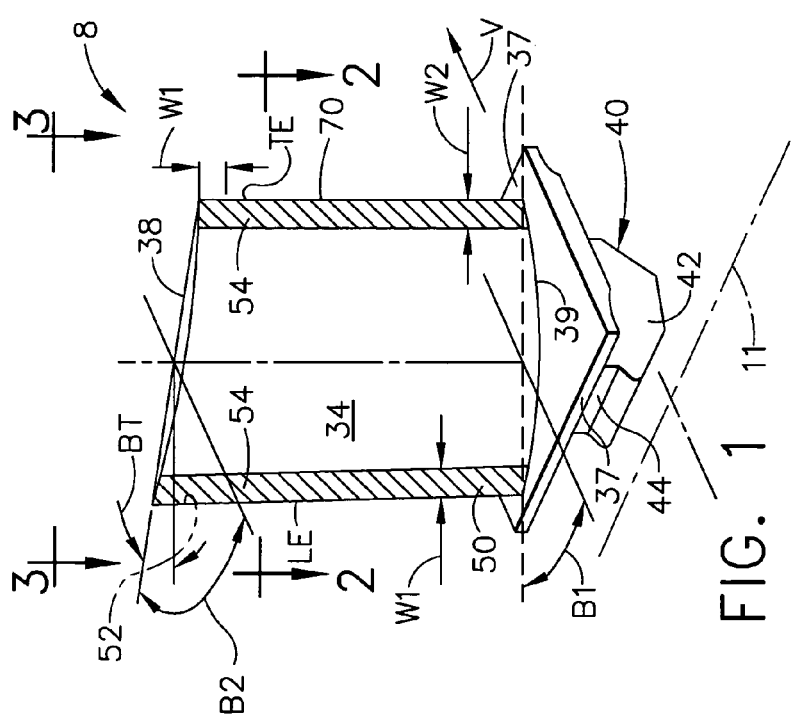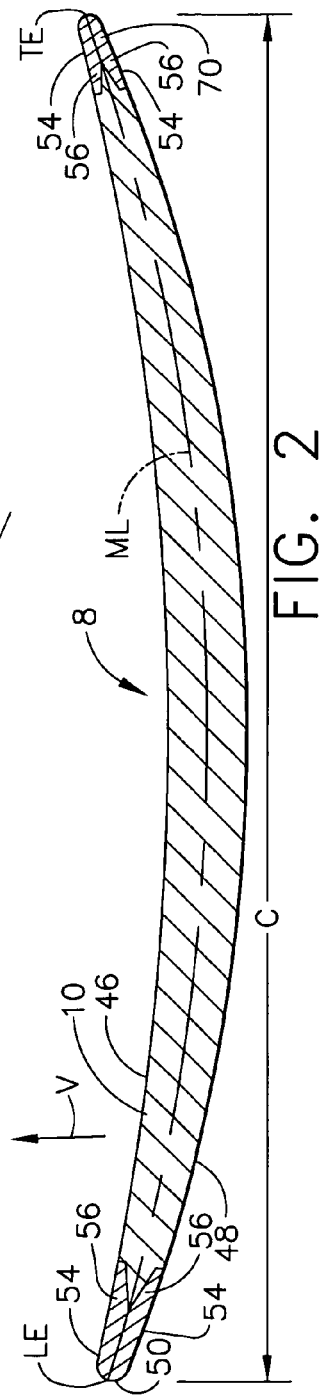

COUNTERING LASER SHOCK PEENING INDUCED AIRFOIL TWIST USING SHOT PEENING

BACKGROUND OF THE INVENTION

This invention relates to gas turbine engine rotor blades with leading and trailing edges having localized compressive residual stresses imparted by laser shock peening and, more particularly, to techniques for countering laser shock peening induced twist of the airfoils of these blades.

Laser shock peening (LSP) or laser shock processing, as it is also referred to, is a process for producing a region of deep compressive residual stresses imparted by laser shock peening a surface area of an article. Laser shock peening typically uses one or more radiation pulses from high and low power pulsed lasers to produce an intense shockwave at the surface of an article similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of the surface. The portion of the surface may have an ablative coating or be bare, meaning having no ablative coating. An explosive force is produced at the impingement point of the laser beam by an instantaneous ablation or vaporization of a thin layer of the material surface or of a coating (such as tape or paint) on the surface which forms a plasma.

Laser shock peening is being developed for many applications in the gas turbine engine field, some of which are disclosed in the following U.S. Pat. No. 5,756,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

High energy laser beams, from about 20 to about 50 Joules, or low energy laser beams, from about 3 to about 10 Joules, have been used and other levels are contemplated. See, for example, U.S. Pat. No. 5,674,329 (Mannava et al.) issued Oct. 7, 1997 (LSP process using high energy lasers) and U.S. Pat. No. 5,932,120 (Mannava et al.) issued Aug. 3, 1999 (LSP process using low energy lasers). Low energy laser beams can be produced using different laser materials such as neodymium doped yttrium aluminum garnet (Nd YAG), Nd:YLF, and others. Laser shock peening processes typically employ a curtain of water or other confinement liquid medium flowed over the article or some other method to provide a plasma confining medium. This medium enables the plasma to rapidly achieve shockwave pressures that produce the plastic deformation and associated residual stress patterns that constitute the LSP effect. The curtain of water provides a confining medium, to confine and redirect the process generated shockwaves into the bulk of the material of a component being LSP'D, to create the beneficial compressive residual stresses.

The LSP process generates deep compressive stresses in the article resulting in improved fatigue strength under foreign object damage (FOD) conditions. LSP improves material properties such as high cycle fatigue, low cycle fatigue, corrosion & erosion resistance. Laser shock peening of leading and/or trailing edges of fan, compressor, and turbine blade airfoils typically includes coating the portion of the edges with an ablative material, such as paint or tape, to provide the material for the plasma. The laser shock peening may be performed on bare or uncoated surfaces. There are associated distortions of thin compressor and turbine blades that alter the profile of the blade and, therefore, may cause substantial aerodynamic problems. These associated distortions include an alteration of twist of the airfoil of the blades. It is highly desirable to reduce or eliminate this laser shock peened induced twist of the airfoil.

BRIEF DESCRIPTION OF THE INVENTION

A gas turbine engine blade and a method of laser shock peening an airfoil of the blade includes laser shock peening a thin airfoil of the blade to such an extent that a laser shock induced twist is caused to form in the airfoil and shot peening at least a portion of the airfoil to counter the laser shock induced twist. The shot peening may be done before or after the laser shock peening. One embodiment of the shot peening includes forming a shot peened patch by shot peening over a laser shock peened surface formed by the laser shock peening. Another embodiment of the shot peening includes forming the shot peened patch before the laser shock peening and then forming the laser shock peened surface with the laser shock peening over the shot peened patch. Another embodiment includes pressure and suction sides of the airfoil that are shot peened unevenly or differently to produce a shot peening induced counter twist.

The shot peening may be performed before or after the laser shock peening. The shot peening may be applied over a laser shock peened surface formed by the laser shock peening. The shot peening may be performed asymmetrically on asymmetrically shot peened pressure and suction side areas of pressure and suction sides, respectively, of the airfoil. The shot peened patch near a blade tip may be formed on one of pressure and suction sides of the airfoil wherein the airfoil extends radially outwardly from a blade platform to the blade tip of the blade.

BRIEF DESCRIPTION OF THE DRAWINGS

FIG. 1 is a perspective view illustration of an exemplary aircraft gas turbine engine blade with a laser shock peened airfoil.

FIG. 2 is a cross sectional view illustration through the airfoil taken along line 2—2 as illustrated in FIG. 1.

DETAILED DESCRIPTION OF THE INVENTION

Figure 3:
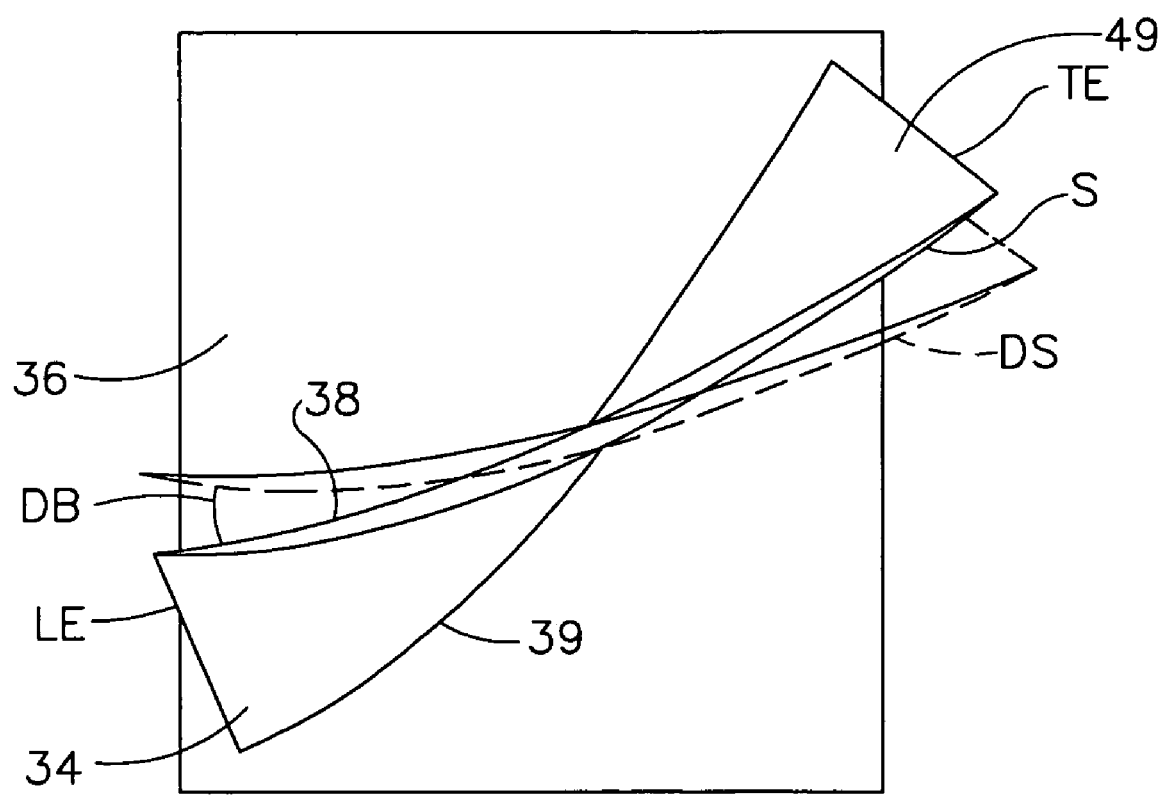
FIG. 3 is a top looking down view of the airfoil before and after the airfoil is laser shock peened illustrating a laser shock induced twist of the airfoil.

Illustrated in FIGS. 1, 2, and 3 is a gas turbine engine blade 8 having a thin airfoil 34 made of a Titanium or Nickel based alloy extending radially outwardly from a blade platform 36 to a blade tip 38. The blade 8 is representative of a compressor or turbine blade with a laser shock peened surface 54 on a metallic substrate 10 of the airfoil 34 along a leading edge LE of the airfoil 34. The blade 8 includes a root section 40 extending radially inward from the platform 36 to a radially inward end 37 of the root section 40. At the radially inward end 37 of the root section 40 is a blade root 42 which is connected to the platform 36 by a blade shank 44. The blade root 42 has a root centerline 45 which is generally parallel to the platform 36, side edges 35 of the platform 36, and the blade shank 44. The roots 42 are shaped to slide into retention slots on a compressor or turbine rotor of the engine.

The airfoil 34 extends in the chordwise direction between the leading edge LE and a trailing edge TE of the airfoil. A chord C of the airfoil 34 is the line between the leading edge LE and trailing edge TE at each cross-section of the blade as illustrated in FIG. 2. A pressure side 46 of the airfoil 34 faces in the general direction of rotation as indicated by an arrow V and a suction side 48 is on the other side of the airfoil and a mean-line ML is generally disposed midway between the two faces in the chordwise direction. The airfoil 34 also has a twist whereby a chord angle varies from a first angle B1 at the platform 36 to a second angle B2 at the tip 38 for which the difference is shown by an angle differential BT. The chord angle is defined as the angle of the chord C with respect to a gas turbine engine or rotor centerline 11, the blade 8 being designed for use in a corresponding gas turbine engine.

The blade 8 has leading and trailing edge sections 50 and 70 that extend along the leading and trailing edges LE and TE, respectively, of the airfoil 34 from the blade platform 36 to the blade tip 38. The leading and trailing edge sections 50 and 70 includes first and second widths W1 and W2, respectively, such that the leading and trailing edge sections 50 and 70 encompass nicks 52 that may form, indicated in phantom line, and tears that may occur along the leading and trailing edges of the airfoil 34. The airfoil 34 is subject to a significant tensile stress field due to centrifugal forces generated by the fan blade 8 rotating during engine operation. The airfoil 34 is also subject to vibrations generated during engine operation and the nicks 52 and tears operate as high cycle fatigue stress risers producing additional stress concentrations around them.

To counter fatigue failure of portions of the airfoil along possible crack lines that can develop and emanate from the nicks and tears, one or both of the pressure side 46 and the suction side 48 are laser shock peened forming the laser shock peened surfaces 54 with a pre-stressed region 56 having deep compressive residual stresses imparted by laser shock peening (LSP) extending into the airfoil 34 from the laser shock peened surfaces 54 as seen in FIG. 2. The pre-stressed regions 56 are illustrated as being co-extensive with the leading and trailing edge sections 50 and 70 in the chordwise direction to the full extent of widths W1 and W2 and are deep enough into the airfoil 34 to coalesce for at least a part of the widths. The pre-stressed regions 56 are shown co-extensive with the leading edge section 50 in the radial direction along the leading edge LE but may be shorter. The laser beam shock induced deep compressive residual stresses in the compressive pre-stressed regions 56 are generally about 50–150 KPSI (Kilo Pounds per Square Inch) extending from the laser shock peened surfaces 54 to a depth of about 20–50 mils into the compressive pre-stressed regions 56.

The coating or the bare metal of the metallic substrate 10 is ablated generating plasma which results in shockwaves on the surface of the material. These shockwaves are redirected towards the laser shock peened surface 54 by a clear liquid confining medium such as a curtain of water, or a confining layer, to generate travelling shockwaves (pressure waves) in the material below the laser shock peened surface 54. The amplitude and quantity of these shockwave determine the depth and intensity of compressive stresses.

Compressor and turbine blades 8 have airfoils 34 that are generally very thin and laser shock peening the airfoil 34 to form the laser shock peened surfaces 54 and associated pre-stressed regions 56 with deep compressive residual stresses as disclosed above can cause airfoil distortion in the form of a laser shock induced twist DB in the airfoil 34 as illustrated in FIG. 3. The laser shock induced twist DB is generally thought to be caused by the curling of the airfoil due to the deep compressive stresses imparted by the laser shock peening process. The laser shock induced twist DB is distributed along the airfoil's edges going from 0 at a base 39 of the airfoil 34 at the platform 36 to a maximum at the tip 38. The laser shock induced blade twist DB has a cumulative effect on local airfoil aerodynamics from the platform 36 of the airfoil to its tip 38 or any portion thereof. The laser shock induced blade twist DB is illustrated as a blade twist distortion between a designed airfoil cross-sectional shape S (of a non-laser shocked airfoil 49) drawn with a solid line and a distorted shape DS drawn with a dashed line.

Figure 4:
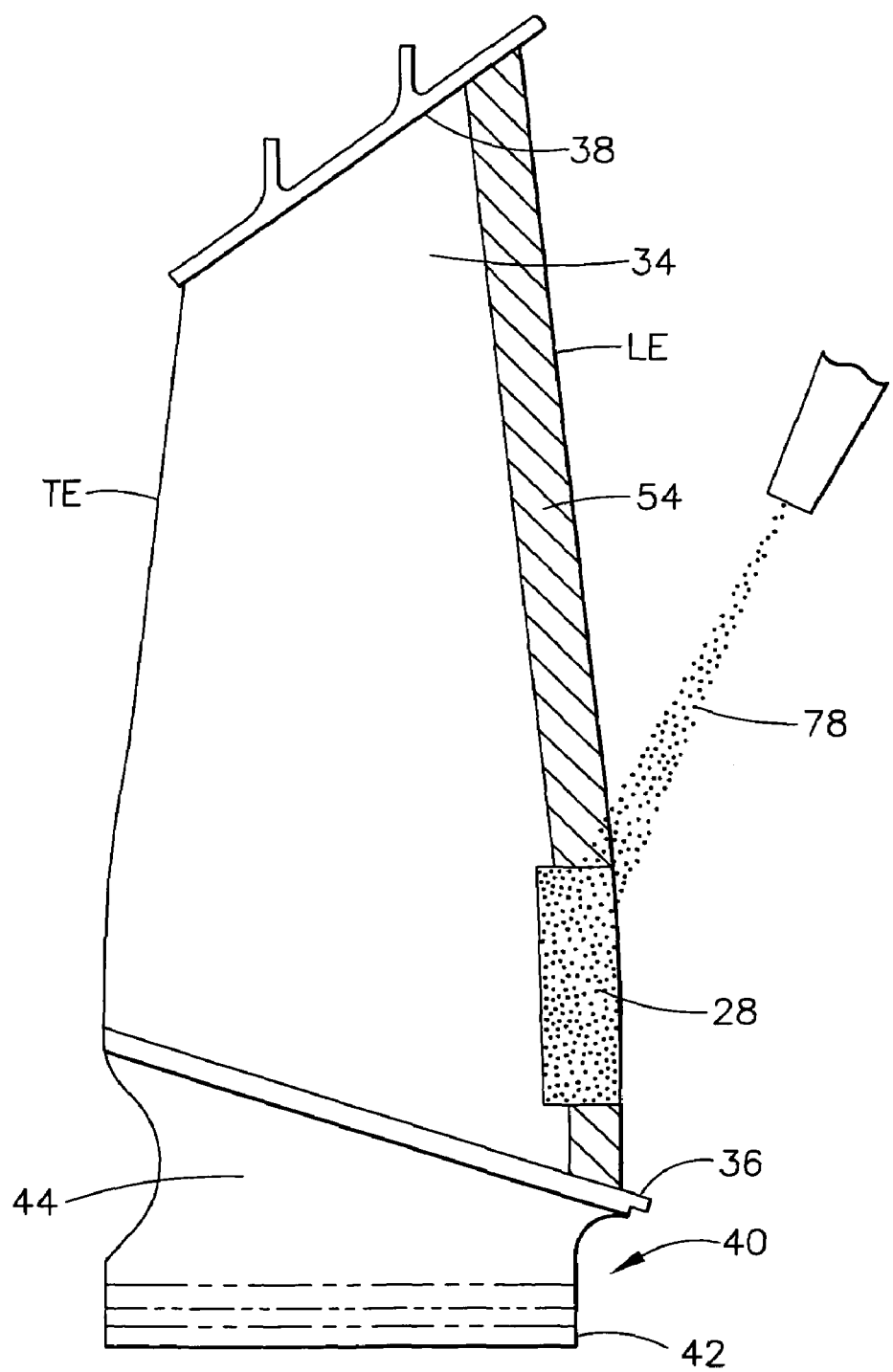
FIG. 4 is a perspective view illustration of the laser shock peened airfoil illustrated in FIG. 1 being laser shock peened.
Figure 5:
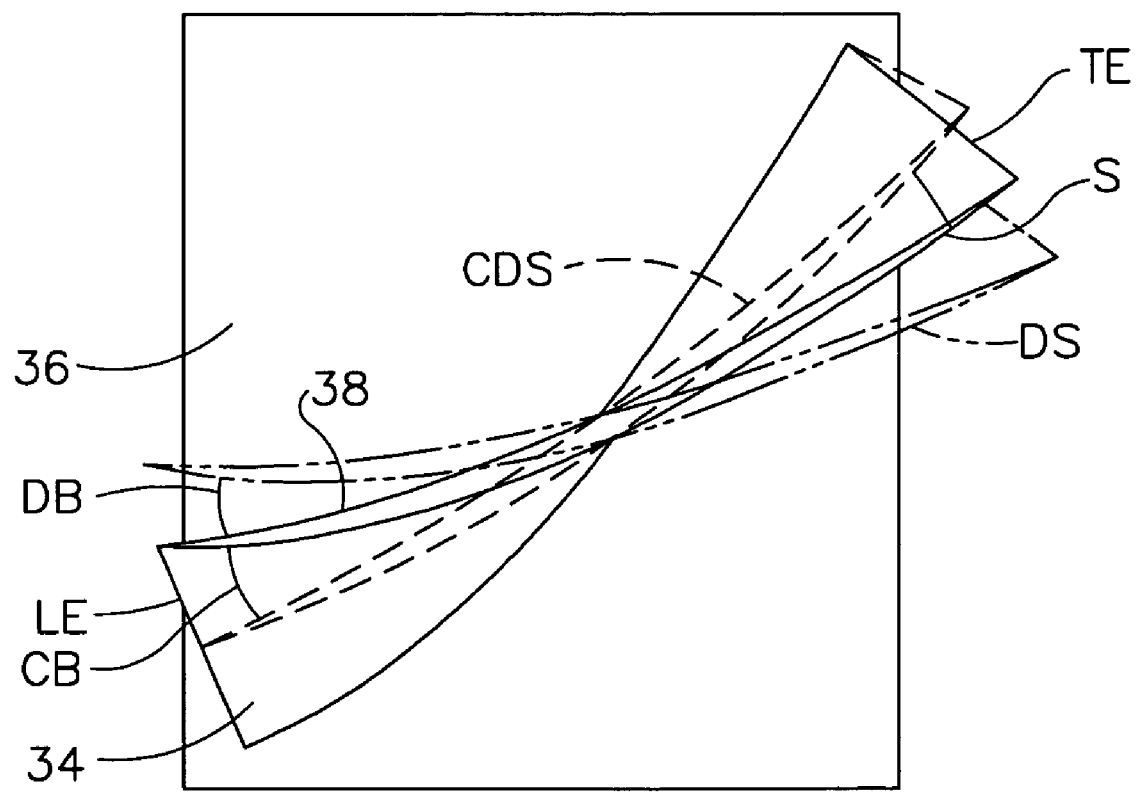
FIG. 5 is a top looking down view of the airfoil before and after the airfoil is laser shock peened and laser shot peened illustrating the laser shock induced twist of the airfoil and a contra-distorting twist formed by the shot peening.
Figure 7:
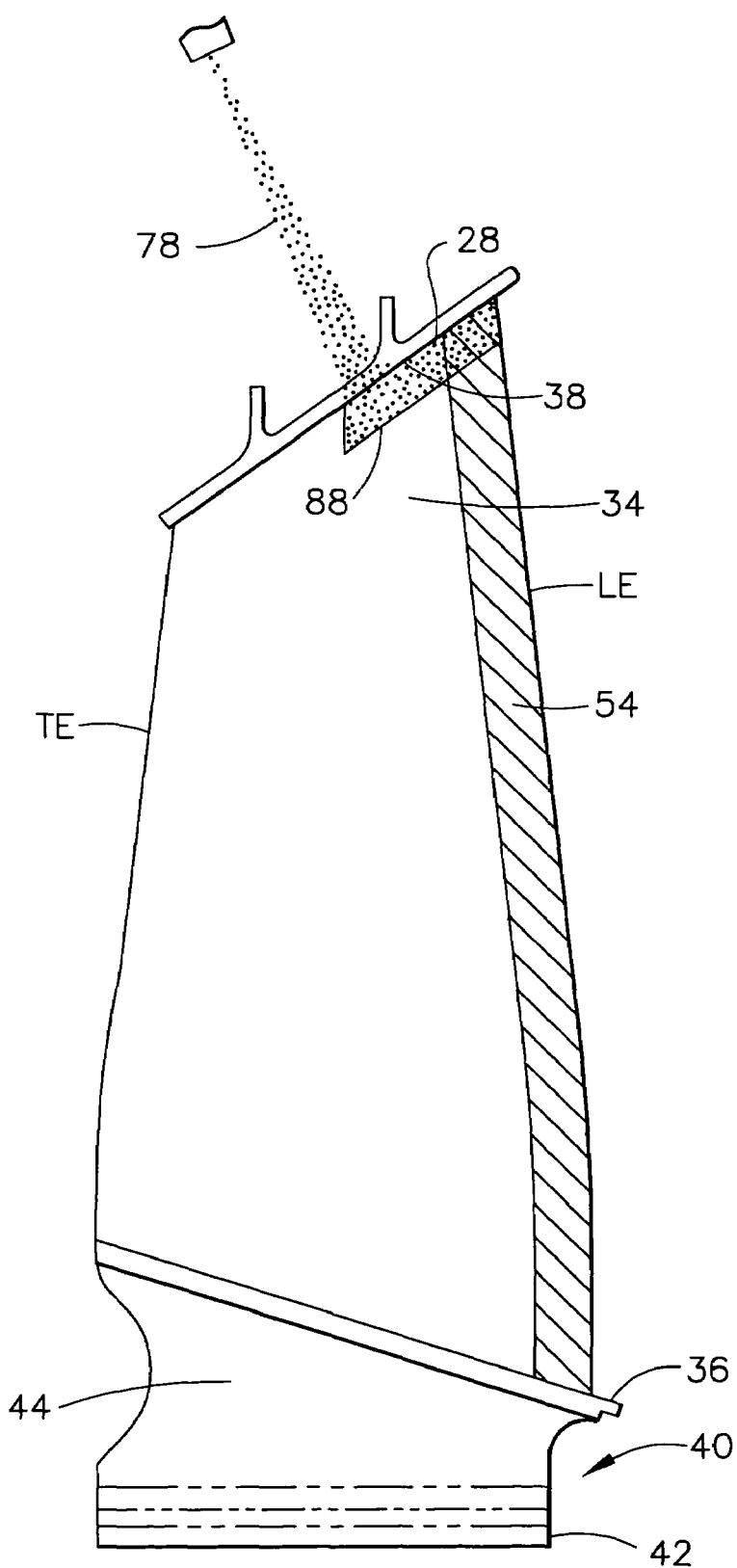
FIG. 7 is a perspective view illustration of the laser shock peened airfoil illustrated in FIG. 1 being laser shock peened near a blade tip of the airfoil.

Referring to FIG. 4, at least a portion, indicated by a shot peened patch 28, of the airfoil 34 is shot peened asymmetrically with respect to the pressure and suction sides 46 and 48, respectively, of the airfoil 34 to counter the laser shock induced twist DB in the airfoil 34. This contra-distorting shot peening forms a contra-distorting twist CB, as illustrated in FIG. 5, and may be performed before or after the laser shock peening of the airfoil. The contra-distorting twist CB is illustrated as contra-distorting twist shape CDS drawn with a dashed line such that after the laser shock and shot peening the airfoil 34 will have the designed airfoil cross-sectional shape S. The shot peened patch 28 may be formed at a tip region 88 on one of the pressure and suction sides 46 and 48 of the airfoil 34 near the blade tip 38 as illustrated in FIG. 7.

The shot peening process typically includes impacting a small diameter cylindrical stream of shot 78 on the shot peened surface as illustrated in FIG. 4. The shot media may include glass, steel or other material. Shot diameter is typically on the order of ½ inch to ¾ inch in airfoil applications and can be as small as ¼ inch. The velocity (gas pressure or gravity/potential energy), density/diameter and duration of the shot stream determine the magnitude of the shot peening effect. The magnitude of the shot peening effect is directly proportional to the amount of cold work or laser shock peening induced distortion of the airfoil as a result of the shot peening. Several methods of shot peening to counter the laser shock induced twist DB in the airfoil 34 are suggested below.

Figure 6:
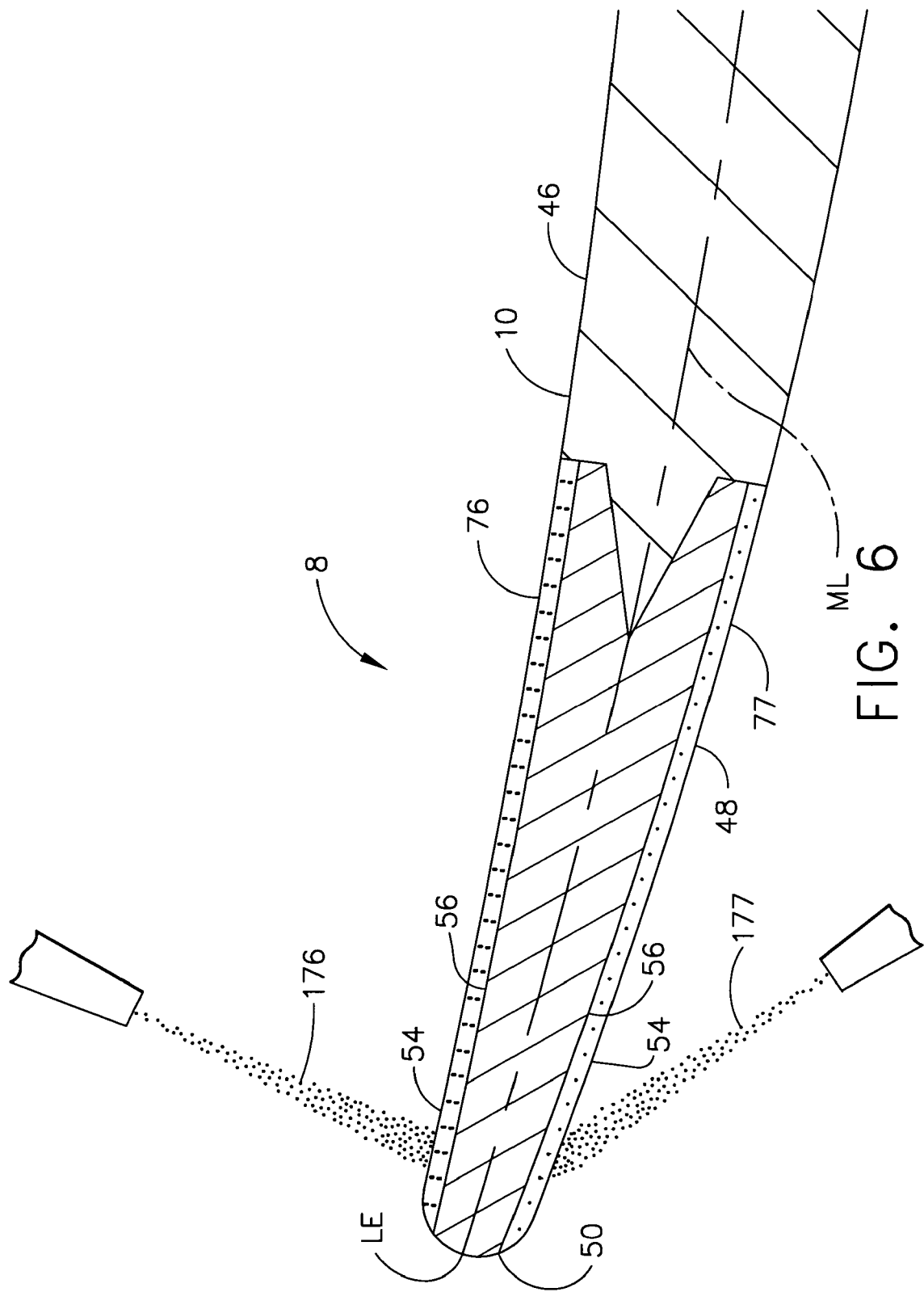
FIG. 6 is a cross sectional view illustration through the airfoil taken along line 2—2 as illustrated in FIG. 1 illustrating a method of shot peening with relatively greater and lesser degrees of shot peening streams applied to asymmetrically shot peened pressure and suction side areas of pressure and suction sides respectively of the airfoil.

One embodiment of the shot peening includes forming a shot peened patch 28 by shot peening over a laser shock peened surface 54 formed by the laser shock peening as illustrated in FIG. 4. Another embodiment of the shot peening includes forming the shot peened patch 28 before the laser shock peening and then forming the laser shock peened surface 54 with the laser shock peening over the shot peened patch 28. The contra-distorting shot peening may be in the form of asymmetrically shot peened pressure and suction side areas 76 and 77 of the pressure and suction sides 46 and 48, respectively, of the airfoil 34 as illustrated in FIG. 6. Unequal degrees of shot peening are used on different sides of the airfoil 34 as indicated by relatively greater and lesser degrees of shot peening streams 176 and 177 applied to the asymmetrically shot peened pressure and suction side areas 76 and 77 of the pressure and suction sides 46 and 48, respectively, of the airfoil 34. The magnitude of the shot peening effect is greater on one of the pressure and suction sides 46 and 48 (illustrated herein as the pressure side) thereby forming the contra-distorting twist CB and the contra-distorting twist shape CDS as illustrated in FIG. 5.

The shot peening process may be performed with two steams of shot applied to both the pressure and suction sides 46 and 48 of the airfoil 34 simultaneously. One of the streams having a reduced velocity to enable the stronger of the two streams to preferentially push the airfoil 34 in a direction opposing the LSP distortion to counter the laser shock induced twist DB. The airfoil 34 cane be shot peened one side at a time with one of the sides shot peened with higher velocity, higher density or longer duration to preferentially push the airfoil 34 in a direction opposing the LSP distortion to counter the laser shock induced twist DB.

Shot peening is already used in producing and/or refurbishing blades and the airfoil 34 could be processed with an added or modified cycle of shot peening to counter the laser shock induced twist DB in the airfoil 34. The shot peening may be performed with a longer duration on one of the pressure and suction sides 46 and 48 or with shutting off or significantly reducing the intensity of the one of the simultaneously applied shot peening streams. A shot peening process can have a longer dwell time at the tip region 88 on one of the pressure and suction sides 46 and 48 of the airfoil near the blade tip 38. Another shot peening process can have a longer dwell time at the tip region 88 on one of the pressure and suction sides 46 and 48 of the airfoil 34 near the blade tip 38 at the trailing edge TE only and inverting the shot intensities from side to side to counter the laser shock induced twist DB. A second pass of shot peening on one of the pressure and suction sides 46 and 48 along the LE, TE, or the tip region 88 may be used to counter the laser shock induced twist DB.

Which contra-distorting method or process for counteracting the distortion or countering the laser shock induced twist DB due to laser shock peening may have to be decided by empirical, semi-empirical, or analytical methods or a combination of any of these methods. The velocity (gas pressure or gravity/potential energy), density/diameter and duration of the shot stream (dwell time) best suited for a particular application requires experimentation and development. The analysis should be directed to design for a desired Kt in the leading and/or trailing edges of the airfoil.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A method for laser shock peening a gas turbine engine blade, the method comprising:
    laser shock peening a thin airfoil of the blade,
    forming a laser shock induced twist in the airfoil,
    shot peening a portion of the airfoil to counter the laser shock induced twist in the airfoil,
    performing the shot peening after the laser shock peening, and
    applying the shot peening over a laser shock peened surface formed by the laser shock peening.

2. A method for laser shock peening a gas turbine engine blade, the method comprising:
    laser shock peening a thin airfoil of the blade,
    forming a laser shock induced twist in the airfoil,
    shot peening a portion of the airfoil to counter the laser shock induced twist in the airfoil,
    performing the shot peening before the laser shock peening, and
    applying the shot peening on an area of the airfoil where a laser shock peened surface is to be formed by the laser shock peening after the shot peening.

3. A method for laser shock peening a gas turbine engine blade, the method comprising:
    laser shock peening a thin airfoil of the blade,
    forming a laser shock induced twist in the airfoil,
    shot peening a portion of the airfoil to counter the laser shock induced twist in the airfoil, and
    the shot peening being performed asymmetrically on asymmetrically shot peened pressure and suction side areas of pressure and suction sides respectively of the airfoil.

4. A method as claimed in claim 3 wherein the shot peening is performed after the laser shock peening.

5. A method as claimed in claim 3 wherein the shot peening is performed before the laser shock peening.

6. A method as claimed in claim 3 further comprising the shot peening performed simultaneously on the asymmetrically shot peened pressure and suction side areas of the pressure and suction sides respectively of the airfoil.

7. A method for laser shock peening a gas turbine engine blade, the method comprising:
    laser shock peening a thin airfoil of the blade,
    forming a laser shock induced twist in the airfoil, and
    shot peening a portion of the airfoil to counter the laser shock induced twist in the airfoil and forming a shot peened patch near a blade tip on one of pressure and suction sides of the airfoil wherein the airfoil extends radially outwardly from a blade platform to the blade tip of the blade.

8. A method for laser shock peening a gas turbine engine blade, said method comprising the following steps:
    laser shock peening along a leading edge on at least one of a pressure side and a suction side of a thin airfoil of the blade,
    the laser shock peening forming a laser shock peened surface extending radially along at least a portion of the leading edge and extending chordwise from the leading edge, the laser shock peening forming a region having deep compressive residual stresses imparted by the laser shock peening extending into the airfoil from the laser shock peened surface, forming a laser shock induced twist in the airfoil, shot peening the airfoil after the laser shock peening to counter the laser shock induced twist in the airfoil, and applying the shot peening over a laser shock peened surface formed by the laser shock peening.

9. A method as claimed in claim 8 wherein the shot peening is performed before the laser shock peening.

10. A method as claimed in claim 9 further comprising the shot peening being applied on an area of the airfoil where a laser shock peened surface is to be formed by the laser shock peening after the shot peening.

11. A method for laser shock peening a gas turbine engine blade, said method comprising the following steps:

laser shock peening along a leading edge on at least one of a pressure side and a suction side of a thin airfoil of the blade, the laser shock peening forming a laser shock peened surface extending radially along at least a portion of the leading edge and extending chordwise from the leading edge, the laser shock peening forming a region having deep compressive residual stresses imparted by the laser shock peening extending into the airfoil from the laser shock peened surface, forming a laser shock induced twist in the airfoil, shot peening the airfoil to counter the laser shock induced twist in the airfoil, and performing the shot peening asymmetrically on asymmetrically shot peened pressure and suction side areas of pressure and suction sides respectively of the airfoil.

12. A method as claimed in claim 11 further comprising the shot peening performed simultaneously on the asymmetrically shot peened pressure and suction side areas of the pressure and suction sides respectively of the airfoil.

13. A method for laser shock peening a gas turbine engine blade, said method comprising the following steps:

laser shock peening along a leading edge on at least one of a pressure side and a suction side of a thin airfoil of the blade, the laser shock peening forming a laser shock peened surface extending radially along at least a portion of the leading edge and extending chordwise from the leading edge, the laser shock peening forming a region having deep compressive residual stresses imparted by the laser shock peening extending into the airfoil from the laser shock peened surface, forming a laser shock induced twist in the airfoil, shot peening the airfoil to counter the laser shock induced twist in the airfoil, and forming a shot peened patch near a blade tip on one of pressure and suction sides of the airfoil wherein the airfoil extends radially outwardly from a blade platform to the blade tip of the blade.

14. A gas turbine engine blade comprising:

a thin metallic airfoil having a leading edge and a trailing edge and extending away from a root of the blade, at least one laser shock peened surface on at least one side of the airfoil of at least one of the leading and edge trailing edges, the laser shock peened surface extending radially along at least a portion of and extending chordwise from the one of the edges, a region having deep compressive residual stresses imparted by laser shock peening extending into the airfoil from the laser shock peened surface, a laser shock induced twist in the airfoil, at least one shot peened portion of the airfoil which counters the laser shock induced twist in the airfoil, and the shot peened portion having been applied over the laser shock peened surface formed by the laser shock peening.

15. A gas turbine engine blade comprising:

a thin metallic airfoil having a leading edge and a trailing edge and extending away from a root of the blade, at least one laser shock peened surface on at least one side of the airfoil of at least one of the leading and edge trailing edges, the laser shock peened surface extending radially along at least a portion of and extending chordwise from the one of the edges, a region having deep compressive residual stresses imparted by laser shock peening extending into the airfoil from the laser shock peened surface, a laser shock induced twist in the airfoil, at least one shot peened portion of the airfoil which counters the laser shock induced twist in the airfoil, and the laser shock peened surface formed by the laser shock peening having been applied over the shot peened portion.

16. A gas turbine engine blade comprising:

a thin metallic airfoil having a leading edge and a trailing edge and extending away from a root of the blade, at least one laser shock peened surface on at least one side of the airfoil of at least one of the leading and edge trailing edges, the laser shock peened surface extending radially along at least a portion of and extending chordwise from the one of the edges, a region having deep compressive residual stresses imparted by laser shock peening extending into the airfoil from the laser shock peened surface, a laser shock induced twist in the airfoil, at least one shot peened portion of the airfoil which counters the laser shock induced twist in the airfoil, and asymmetrically shot peened pressure and suction side areas of pressure and suction sides respectively of the airfoil.

17. A gas turbine engine blade comprising:

a thin metallic airfoil having a leading edge and a trailing edge and extending away from a root of the blade, at least one laser shock peened surface on at least one side of the airfoil of at least one of the leading and edge trailing edges, the laser shock peened surface extending radially along at least a portion of and extending chordwise from the one of the edges, a region having deep compressive residual stresses imparted by laser shock peening extending into the airfoil from the laser shock peened surface, a laser shock induced twist in the airfoil, at least one shot peened portion of the airfoil which counters the laser shock induced twist in the airfoil, and a shot peened patch near a blade tip on one of pressure and suction sides of the airfoil wherein the airfoil extends radially outwardly from a blade platform to the blade tip of the blade.

* * * * *